United States Patent
Huntemann et al.

(10) Patent No.: US 8,105,671 B2
(45) Date of Patent: Jan. 31, 2012

(54) SYNTACTIC POLYURETHANE CONTAINING OIL, PREFERABLY CASTOR OIL

(75) Inventors: Peter Huntemann, Stemshorn (DE); Udo Schilling, Diepholz (DE)

(73) Assignee: BASF Aktiengesellschaft, Ludwigshafen (DE)

(*) Notice: Subject to any disclaimer, the term of this patent is extended or adjusted under 35 U.S.C. 154(b) by 292 days.

(21) Appl. No.: 10/581,449

(22) PCT Filed: Dec. 9, 2004

(86) PCT No.: PCT/EP2004/013993
§ 371 (c)(1),
(2), (4) Date: Jun. 1, 2006

(87) PCT Pub. No.: WO2005/056630
PCT Pub. Date: Jun. 23, 2005

(65) Prior Publication Data
US 2007/0110940 A1 May 17, 2007

(30) Foreign Application Priority Data
Dec. 11, 2003 (DE) .................. 103 58 371

(51) Int. Cl.
*F16L 9/133* (2006.01)
*F16L 9/12* (2006.01)
*F16L 9/147* (2006.01)
*B05D 1/02* (2006.01)

(52) U.S. Cl. .............. 428/36.91; 428/36.9; 427/425; 138/145

(58) Field of Classification Search .............. 428/36.9, 428/36.91; 521/111, 170; 523/218; 527/301; 427/425; 138/145
See application file for complete search history.

(56) References Cited

U.S. PATENT DOCUMENTS

| 5,621,043 | A | * | 4/1997 | Croft | 525/111 |
| 5,688,860 | A | * | 11/1997 | Croft | 524/710 |
| 6,387,447 | B1 | * | 5/2002 | Grimm et al. | 427/373 |
| 2003/0216486 | A1 | * | 11/2003 | Kawamoto et al. | 521/50 |

FOREIGN PATENT DOCUMENTS

| DD | 299 120 | | 4/1992 |
| DE | 197 28 792 | | 1/1999 |
| EP | 0 896 976 | | 2/1999 |
| JP | 59-197466 | * | 11/1984 |
| JP | 60-013855 | * | 1/1985 |
| JP | 63-264676 | * | 11/1988 |
| WO | 87/01070 | | 2/1987 |
| WO | 94/00504 | | 1/1994 |
| WO | 99/03922 | | 1/1999 |
| WO | 02/072701 | | 9/2002 |

OTHER PUBLICATIONS

Derwent Abstract translation and Summary of JP 63-264676 Nov. 1988.*
Translated abstract for JP 59-197466 Nov. 1984.*
Translated abstract for JP 60-013855 Jan. 1985.*
Human Translation of JP 59-197466 (Nov. 1984).*

* cited by examiner

*Primary Examiner* — Rena Dye
*Assistant Examiner* — Erik Kashnikow
(74) *Attorney, Agent, or Firm* — Oblon, Spivak, McClelland, Maier & Neustadt, L.L.P.

(57) ABSTRACT

Syntactic polyurethanes are obtainable by reacting a polyisocyanate component a) with a polyol component, the polyol component b) comprising a polyetherpolyol mixture having an average OH number of from 10 to 280 (constituent b1) and an oil based on fatty acids of 6 to 25 carbon atoms or derivatives thereof (constituent b2), in the presence of hollow microspheres c). Furthermore, the syntactic polyurethanes are used for insulating offshore pipes and other parts and equipment used in the offshore sector, and the insulated offshore pipes as such are described.

11 Claims, No Drawings

SYNTACTIC POLYURETHANE CONTAINING OIL, PREFERABLY CASTOR OIL

The present invention relates to a syntactic polyurethane obtainable by reacting a polyisocyanate component a) with a polyol component, the polyol component b) comprising a polyetherpolyol mixture having an average OH number of from 10 to 280 (constituent b1) and an oil based on fatty acids of 6 to 25 carbon atoms or derivatives thereof (constituent b2), in the presence of hollow microspheres c). The present invention furthermore relates to the use of the syntactic polyurethanes for insulating offshore pipes, and the insulated offshore pipes as such, as well as other parts and equipment used in the offshore sector.

The term syntactic plastics comprises in general plastics which contain hollow fillers. Syntactic plastics are usually used as thermal insulating coatings, preferably in the offshore sector owing to their advantageous compressive strength and thermal stability. Other known applications are as fireproof material and as sound insulation material.

WO 87/1070 describes a heat insulation material consisting of elastomeric plastic, for example rubber or styrene/butadiene, as a matrix and hollow glass microspheres, the latter being incorporated in an amount of 40-80% by volume.

WO 99/3922, WO 02/72701 and EP-A-896 976 describe syntactic polyurethanes which consist of polyurethane and hollow glass microspheres and are preferably used as an insulating coating for pipes in the offshore sector. Production is effected by adding hollow microspheres to one of the polyurethane system components and then mixing the system components. WO 99/3922 discloses the use of small amounts of castor oil in the isocyanate component.

DD 299 120 describes a polyurethane system comprising a special polyol component with polyetherpolyols having high OH numbers and castor oil, and glass microspheres for insulating stoneware sewage pipes. The glass spheres used are not hollow spheres. The polyurethane system disclosed has improved low-temperature behavior.

In order to obtain good insulation properties of a foam system, it is advantageous to incorporate as many hollow microspheres as possible into the system. What is problematic is that this high filler content is realized as a rule by the use of low molecular weight and low-viscosity polyol systems, which, however, lead to an unsatisfactory hydrolysis behavior and to an unsatisfactory low-temperature flexibility.

It is an object of the present invention to provide a formulation for the preparation of syntactic polyurethanes which, on the one hand, permits a high load of hollow microfillers and thus leads to a low overall density and, on the other hand, permits the properties required for offshore insulation, such as good stability to hydrolysis and good low-temperature flexibility.

We have found that this object is achieved by preparing a syntactic polyurethane by reacting commercial polyisocyanates with a special polyol formulation.

The present invention therefore relates to a syntactic polyurethane obtainable by reacting
a) a polyisocyanate component with
b) a polyol component, the polyol component b) comprising the constituents
    b1) a polyetherpolyol mixture having an average OH number of from 10 to 280 and
    b2) an oil based on fatty acids of 10 to 25 carbon atoms or derivatives thereof, in the presence of
c) hollow microspheres.

In the context of this invention, the term hollow microspheres c) is to be understood as meaning organic and mineral hollow spheres. The organic hollow spheres used may be, for example, hollow plastics spheres, for example comprising polyethylene, polypropylene, polyurethane, polystyrene or a blend thereof. The mineral hollow spheres may contain, for example, clay, aluminum silicate, glass or a mixture thereof.

In the interior, the hollow spheres may have a vacuum or partial vacuum or may be filled with air, inert gases, for example nitrogen, helium or argon, or reactive gases, for example oxygen.

Usually, the organic/polymeric or mineral hollow spheres have a diameter of from 1 to 1000 µm, preferably from 5 to 200 µm. Usually, the organic or mineral hollow spheres have a bulk density of from 0.1 to 0.4 g/cm$^3$. They generally have a thermal conductivity of from 0.03 to 0.12 W/mK.

Preferably used hollow microspheres are hollow glass microspheres. In a particularly preferred embodiment, the hollow glass microspheres have a hydrostatic compressive strength of at least 20 bar. For example, 3M—Scotchlite® Glass Bubbles may be used as hollow glass microspheres.

The hollow microspheres are generally added in an amount of from 1 to 80, preferably from 2 to less than 50, more preferably from 5 to 35, particularly preferably from 10 to 30, % by weight, based on the total weight of the resulting syntactic polyurethane.

The following is applicable for the components a) and b):

The polyisocyanates a) used include the conventional aliphatic, cycloaliphatic and in particular aromatic di- and/or polyisocyanates. Toluene diisocyanate (TDI), diphenylmethane diisocyanate (MDI) and in particular mixtures of diphenylmethane diisocyanate and polyphenylenepolymethylene polyisocyanates (crude MDI) are preferably used. The isocyanates may also be modified, for example by incorporating uretdione, carbamate, isocyanurate, carbodiimide, allophanate and in particular urethane groups.

The polyetherpolyols used in the polyol component b) are prepared by processes known from the literature, for example by anionic polymerization with alkali metal hydroxides or alkali metal alcoholates as catalysts or with the aid of double metal cyanide catalysts or with addition of at least one initiator molecule which contains bonded reactive hydrogen atoms, from one or more alkylene oxides having 2 to 4 carbon atoms in the alkylene radical. Suitable alkylene oxides are, for example, tetrahydrofuran, ethylene oxide and 1,2-propylene oxide. The alkylene oxides may be used individually, alternately in succession or as a mixture.

Mixtures of 1,2-propylene oxide and ethylene oxide are preferred, in particular the ethylene oxide being used in amounts of from 10 to 50% as an ethylene oxide end cap (EO cap), so that the resulting polyols have over 70% of primary OH terminal groups. In a further particularly preferred embodiment, only 1,2-propylene oxide is used as the alkylene oxide.

Suitable initiator molecules are preferably alcohols, amines or alkanolamines, the functionality of the initiator molecules generally being from two to six, preferably from 2 to 3, in particular 3.

For example, ethanediol, 1,2- and 1,3-propanediol, diethylene glycol, dipropylene glycol, 1,4-butanediol or 1,6-hexanediol or mixtures thereof may be used as difunctional initiator molecules. Diethylene glycol or dipropylene glycol is preferably used. Glycerol, trimethylolpropane or a mixture thereof is preferably used as trifunctional initiator molecules for the preparation of the constituent b2). Pentaerythritol is possible as a tetrafunctional initiator molecule.

In a preferred embodiment, a di- or trifunctional initiator molecule is used for the preparation of the component b1), a trifunctional initiator molecule particularly preferably being used. In particular, glycerol is used as an initiator molecule.

In general, the alkoxylation of the constituent b1) is carried out in a manner such that the constituent b1) has an OH number (OH number=functionality of the initiator molecule ×56 100/molecular weight) of from 10 to 280, preferably from 15 to 150, particularly preferably from 20 to 90, in particular from 25 to 60.

It is particularly preferable if the abovementioned OH numbers are achieved using a trifunctional initiator molecule.

In the polyol components, an oil based on fatty acids of 6 to 25, preferably 10 to 24, particularly preferably 12 to 22, carbon atoms or a derivative thereof is used as constituent b2). The oils known from the prior art and based on fatty acids of 6 to 25 carbon atoms can be used as b2), provided that they are compatible with the polyurethane system components.

The oil is preferably a triglyceride of a fatty acid of 6 to 25 carbon atoms or a derivative thereof. Particularly preferably, the oil also contains free glycerol in addition to the triglycerides of fatty acids of 6 to 25 carbon atoms. In general, the free glycerol content is from 0.1 to 20, preferably from 5 to 15, in particular from 7 to 12, % by weight, based on the total weight of the oil.

Examples of suitable acids are caproic acid, caprylic acid, capric acid, lauric acid, myristic acid, palmitic acid, stearic acid, arachidic acid, behenic acid, lignoceric acid, lauroleic acid, myristoleic acid, palmitoleic acid, oleic acid, gadoleic acid, erucic acid, ricinoleic acid, linoleic acid and linolenic acid. The acids may be used individually or as a mixture. Palmitic acid, stearic acid, oleic acid, ricinoleic acid, linoleic acid and linolenic acid are preferably used. Ricinoleic acid is particularly preferably used.

The oils to be used may be synthetic or natural oils. Castor oil is particularly preferably used as constituent b2).

The oils b2) can be used as such or in the form of derivatives. Here, derivatives are understood as meaning the substances which are known from the prior art and are obtainable by modifying the oils. Examples of modifications are transformations at the double bonds, for example by thermal polymerization, isomerization, dehydration or addition or substitution at the double bonds, or transformation of the glyceride system, for example by transesterification.

Being a preferably used derivative, dehydrated castor oil, which is obtainable by dehydration of castor oil, is used as constituent b2).

In a preferred embodiment, the polyol component b) may furthermore contain a chain extender b3), as a constituent. Chain extenders are understood as meaning in general branched or straight-chain alcohols or amines, preferably dihydric alcohols, having a molecular weight of less than 400, preferably less than 300, in particular from 60 to 250, g/mol. Examples of these are ethylene glycol, 1,4-butanediol, 1,3-propanediol, diethylene glycol or dipropylene glycol. 1,4-Butanediol is preferably used. Dipropylene glycol is particularly preferably used.

In a preferred embodiment, the individual constituents of the polyol component b) are chosen so that the polyol component b) has a viscosity at 25° C. of from 200 to 1 500, preferably from 300 to 1 300, particularly preferably from 400 to 1 100, mPa·s, measured according to DIN 53019.

In general, the individual constituents of the polyol component b) are used in the following amounts, based in each case on the total weight of the component b):

b1) in an amount of from 5 to 60, preferably from 7 to 30, particularly preferably from 8 to 25, in particular from 10 to 20, % by weight, b2) in an amount of from 10 to 90, preferably from 20 to 85, more preferably from 40 to 83, particularly preferably from 50 to 80, in particular from 55 to 75, % by weight.

If chain extenders b3) are used, they are employed in an amount of from 3 to 25, preferably from 5 to 15, particularly preferably from 7 to 12, % by weight, based on the total weight of the component b).

If required, additives may also be added to the polyol component. Examples of these are catalysts (compounds which accelerate the reaction of the isocyanate component with the polyol component), surface-active substances, dyes, pigments, hydrolysis stabilizers and/or antioxidants and UV stabilizers.

It is furthermore possible to add the blowing agents known from the prior art to the polyol component b). However, it is preferable if the isocyanate component and the polyol component contain no physical and no chemical blowing agent. It is furthermore preferable if no water is added to the components. Thus, the components a) and b) particularly preferably contain no blowing agent, apart from residual water, which is contained in industrially produced polyols.

If is furthermore preferable if the residual water content is reduced by adding water scavengers. Examples of suitable water scavengers are zeolites. The water scavengers are used, for example, in an amount of from 0.1 to 10% by weight, based on the total weight of the polyol component b).

In addition to the novel syntactic polyurethanes, the present invention furthermore relates to a process for the preparation of syntactic polyurethanes by reacting a) a polyisocyanate component with b) a polyol component, the polyol component b) comprising the constituents b1) a polyetherpolyol mixture having an average OH number of from 10 to 280 and b2) an oil based on fatty acids of 6 to 25 carbon atoms or derivatives thereof, in the presence of c) hollow microspheres.

For the components a) to c) used, reference is made here to the above statements. This also applies to the additives described above.

For the preparation of the polyurethanes, the polyisocyanates a) and polyol component b) are reacted in amounts such that the ratio of the number of equivalents of NCO groups of polyisocyanates a) to the sum of the reactive hydrogen atoms of the component b) is from 1:0.5 to 1:3.50 (corresponding to an isocyanate index of from 50 to 350), preferably from 1:0.85 to 1:1.30, particularly preferably from 1:0.9 to 1:1.15.

The starting components are usually mixed at from 0 to 100° C., preferably from 15 to 60° C., and reacted. The mixing can be effected using the conventional PU processing machines. In a preferred embodiment, the mixing is effected by means of low-pressure machines or high-pressure machines.

The hollow microspheres c) are incorporated into the PU components by methods known from the prior art. It is possible to add the hollow microspheres before the reaction to at least one of the components a) or b) and/or to add the hollow microspheres immediately after reaction of the components a) and b) to the still reacting reaction mixture. Examples of suitable mixing methods are described in WO 94/20286, WO 02/102887 and WO 02/072701. The mixing pot method according to WO 02/102887 is preferably used.

The present invention furthermore relates to the use of the novel syntactic polyurethanes for insulating offshore pipes and for the production of sockets for offshore pipes, and for the production or coating of other parts and equipment in the offshore sector. Examples of other parts and equipment in the offshore sector are generators, pumps and buoys.

In the context of this invention, offshore pipe is understood as meaning a pipe which serves for transporting oil and gas. The oil/gas generally flows therein from the sea bed to platforms, into ships/tankers or directly onto land.

Sockets are to be understood as meaning the joints between two pipes or pipe sections.

The present invention therefore relates to an offshore pipe, composed of
(i) an inner pipe and, adhesively applied thereto,
(ii) a layer of novel syntactic polyurethanes.

In a preferred embodiment, the layer of novel syntactic polyurethanes has a thickness of from 5 to 200 mm, preferably from 10 to 170 mm, particularly preferably from 15 to 150 mm.

It is furthermore possible for a further layer, for example a top layer of a thermoplastic, to be applied to the layer of novel polyurethane. However, it is preferable if no further layer is applied to the layer (ii) of syntactic polyurethane in the novel offshore pipes.

Finally, the present invention relates to a method (also referred to as rotation casting method) for the production of novel offshore pipes, comprising the steps
1) provision of an inner pipe which is to be coated with syntactic polyurethane,
2) axial rotation of the pipe to be coated and
3) application of an unreacted reaction mixture for the production of the layer of syntactic polyurethane, comprising the components a), b) and c), to the rotating pipe.

In general, the application of the reaction mixture is effected in step 3) by pouring onto the rotating pipe. The reaction mixture is a polyurethane mixture which was obtained by mixing the components a), b) and c) by means of conventional mixing apparatuses, for example a low-pressure mixing head. The advance of the mixing head is generally set so that the desired thickness of the syntactic polyurethane layer is achieved with constant output.

We claim:
1. An offshore pipe composed of
 (i) an inner pipe and, adhesively applied thereto,
 (ii) a layer of a syntactic polyurethane obtainable by reacting
  a) a polyisocyanate component with
  b) a polyol component, the polyol component b) comprising the constituents
   b1) a polyetherpolyol mixture having an average OH number of from 10 to 280 and
   b2) an oil based on fatty acids of 6 to 25 carbon atoms or derivatives thereof in an amount of from 10 to 90% by weight based on the total weight of the polyol component b),
 in the presence of
 c) hollow microspheres.

2. The offshore pipe according to claim 1, wherein the polyol component b) additionally comprises the constituent b3) chain extender.

3. The offshore pipe according to claim 1, wherein the component b2) is castor oil.

4. The offshore pipe according to claim 1, wherein the individual constituents of the polyol component b) are selected so that the polyol component b) has a viscosity at 25° C. of from 200 to 1,500 mPa·s, measured according to DIN 53019.

5. An offshore pipe according to claim 1, wherein the layer (ii) of syntactic polyurethane has a thickness of from 5 to 200 mm.

6. A process for the production of offshore pipes according to claim 1, comprising the steps
 1) provision of an inner pipe which is to be coated with syntactic polyurethane,
 2) rotation of the pipe to be coated and
 3) application of an unreacted reaction mixture for the production of the layer of syntactic polyurethane, comprising the components a), b) and c), to the rotating pipe.

7. The offshore pipe of claim 1, wherein component b2) is in an amount of 20-85% by weight.

8. The offshore pipe of claim 1, wherein component b2) is in an amount of 40-83% by weight.

9. The offshore pipe of claim 1, wherein component b2) is in an amount of 50-80% by weight.

10. The offshore pipe of claim 1, wherein component b2) is in an amount of 55-75% by weight.

11. The offshore pipe of claim 1 wherein said syntactic polyurethane has good stability to hydrolysis.

* * * * *